(12) United States Patent
Li et al.

(10) Patent No.: US 7,589,796 B2
(45) Date of Patent: Sep. 15, 2009

(54) VIDEO DISPLAY DEVICE, VIDEO ENCODER, AND METHODS FOR USE THEREWITH

(75) Inventors: Xinghai (Billy) Li, North York (CA); Chun-Chin (David) Yeh, Thornhill (CA); Xu Gang (Wilf) Zhao, Toronto (CA)

(73) Assignee: VIXS Systems Inc., Toronto, Ontario (CA)

( * ) Notice: Subject to any disclaimer, the term of this patent is extended or adjusted under 35 U.S.C. 154(b) by 740 days.

(21) Appl. No.: 11/348,120

(22) Filed: Feb. 6, 2006

(65) Prior Publication Data

US 2007/0183512 A1 Aug. 9, 2007

(51) Int. Cl.
*H04N 7/32* (2006.01)
(52) U.S. Cl. ..................................... 348/700
(58) Field of Classification Search .................. None
See application file for complete search history.

(56) References Cited

U.S. PATENT DOCUMENTS 5,442,407 A * 8/1995 Iu .............................. 348/620
2007/0071342 A1 * 3/2007 Bilbrey et al. ............... 382/254
2007/0076798 A1 * 4/2007 Imahashi et al. ......... 375/240.24

* cited by examiner

*Primary Examiner*—Paulos M Natnael

(57) ABSTRACT

A video encoder includes a receiving module for receiving a video signal, the video signal including a plurality of fields, wherein each of the plurality of fields includes a plurality of pixels. The video encoder further includes a signal processor having a signal processing module for generating a processed video signal and a video encoding module for producing an encoded video signal based on the processed video signal. The signal processing module includes a video filter module that is enabled when a filter enable signal is asserted and disabled when the filter enable signal is deasserted. The video filter module filters at least one of the plurality of pixels of a corresponding one of the plurality of fields when the video filter module is enabled. The signal processor also includes a filter enable module for generating the filter enable signal, the filter enable module including a motion detection module for detecting motion in the at least one of the plurality of pixels and for deasserting the filter enable signal when motion is detected in the at least one of the plurality of pixels.

50 Claims, 13 Drawing Sheets

VIDEO DISPLAY DEVICE, VIDEO ENCODER, AND METHODS FOR USE THEREWITH

TECHNICAL FIELD OF THE INVENTION

The present invention relates to video filters and related methods used in devices such as video encoders and video display devices.

DESCRIPTION OF RELATED ART

Video display devices are used in a wide variety of electronic equipment including televisions, computers and computer monitors, portable digital video disk (DVD) players, and other devices that provide a video display based on a video signal. Video filters such as comb filters are frequently used in video display devices to enhance picture detail from video broadcasts and other composite sources. Video filters can reduce discolorations in picture detail, provides purer color and reduce or eliminate video artifacts such as dot crawl and rainbow swirls. These filters work well when a picture is stationary, however, motion in the video image can produce undesirable picture degradation.

The need exists for video display devices that can be implemented efficiently, and that can provide enhanced picture quality over a wide range of images.

SUMMARY OF THE INVENTION

The present invention sets forth a video display device, a video encoder and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
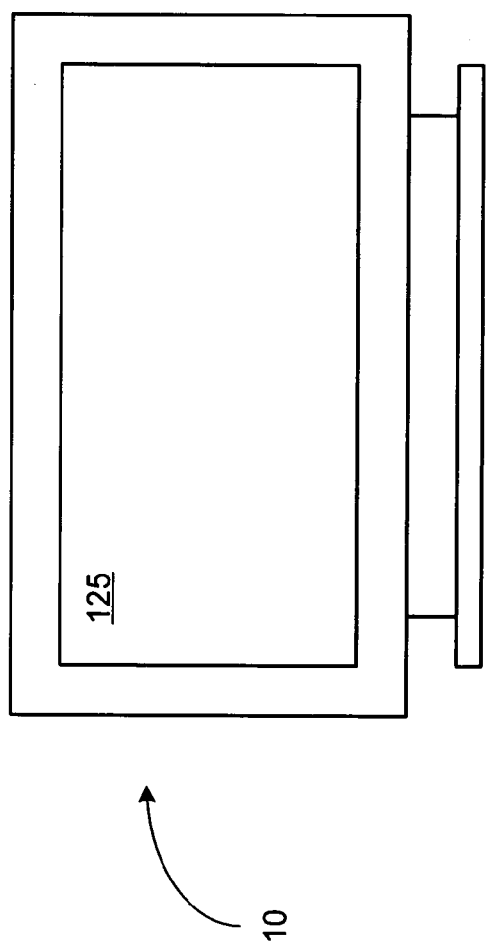
FIGS. 1-3 present pictorial diagram representations of a various video display devices in accordance with embodiments of the present invention.
Figure 3:
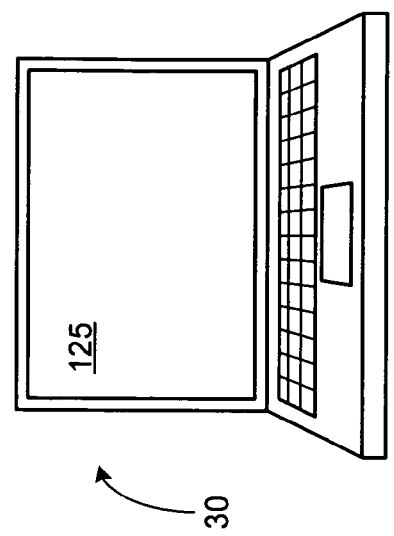
Figure 2:
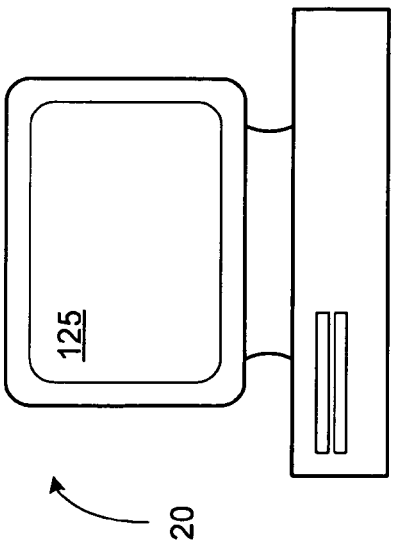

FIGS. 1-3 present pictorial diagram representations of a various video display devices in accordance with embodiments of the present invention. In particular, television 10, computer 20 and portable computer 30 illustrate electronic devices that incorporate a video display device 125 that includes one or more features or functions of the present invention. While these particular devices are illustrated, video display device 125 includes any device that is capable of displaying video content in accordance with the methods and systems described in conjunction with FIGS. 4-16 and the appended claims.

Figure 4:
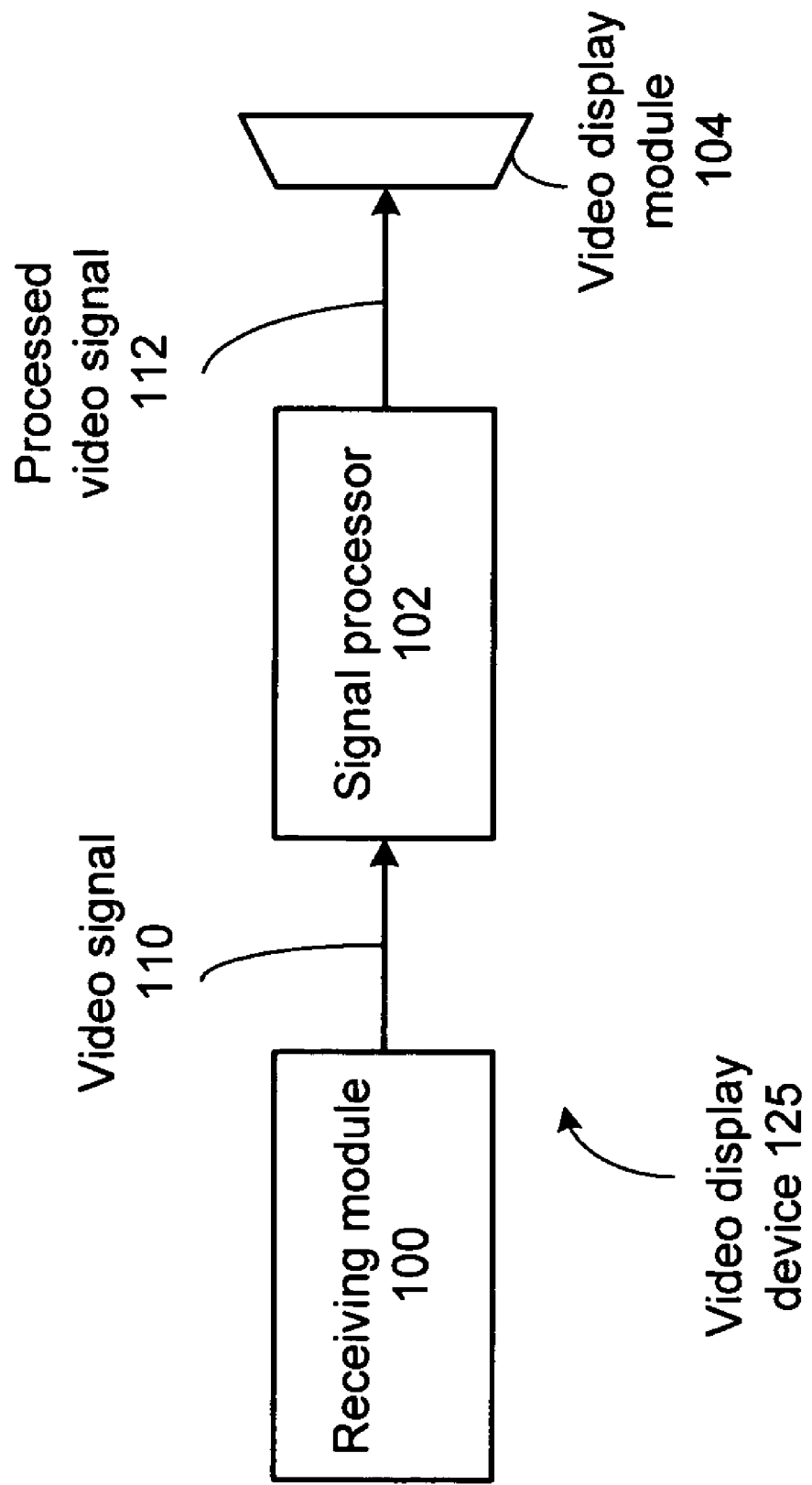
FIG. 4 presents a block diagram representation of a video display device in accordance with an embodiment of the present invention.

FIG. 4 presents a block diagram representation of a video display device in accordance with an embodiment of the present invention. In particular, video display device 125 includes a receiving module 100 for receiving a video signal. Signal processor 102 is operably coupled to the receiving module 100 for generating a processed video signal 112. Video display module 104 is operably coupled to the signal processor 102 for producing a video display based on the processed video signal 112.

In an embodiment of the present invention, the video signal 110 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet. The video signal includes a plurality of fields, wherein each of the plurality of fields includes a plurality of pixels.

Video signal 110 can include an analog video signal that is formatted in any of a number of video formats including National Television Systems Committee (NTSC), Phase Alternating Line (PAL) or Sequentiel Couleur Avec Memoire (SECAM). Further, video signal 110 can be in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display module 104 can be a cathode ray tube (CRT), liquid crystal display (LCD), plasma screen or other display that creates an optical image based on processed video signal 112, either directly or indirectly, such as by projection.

Figure 6:
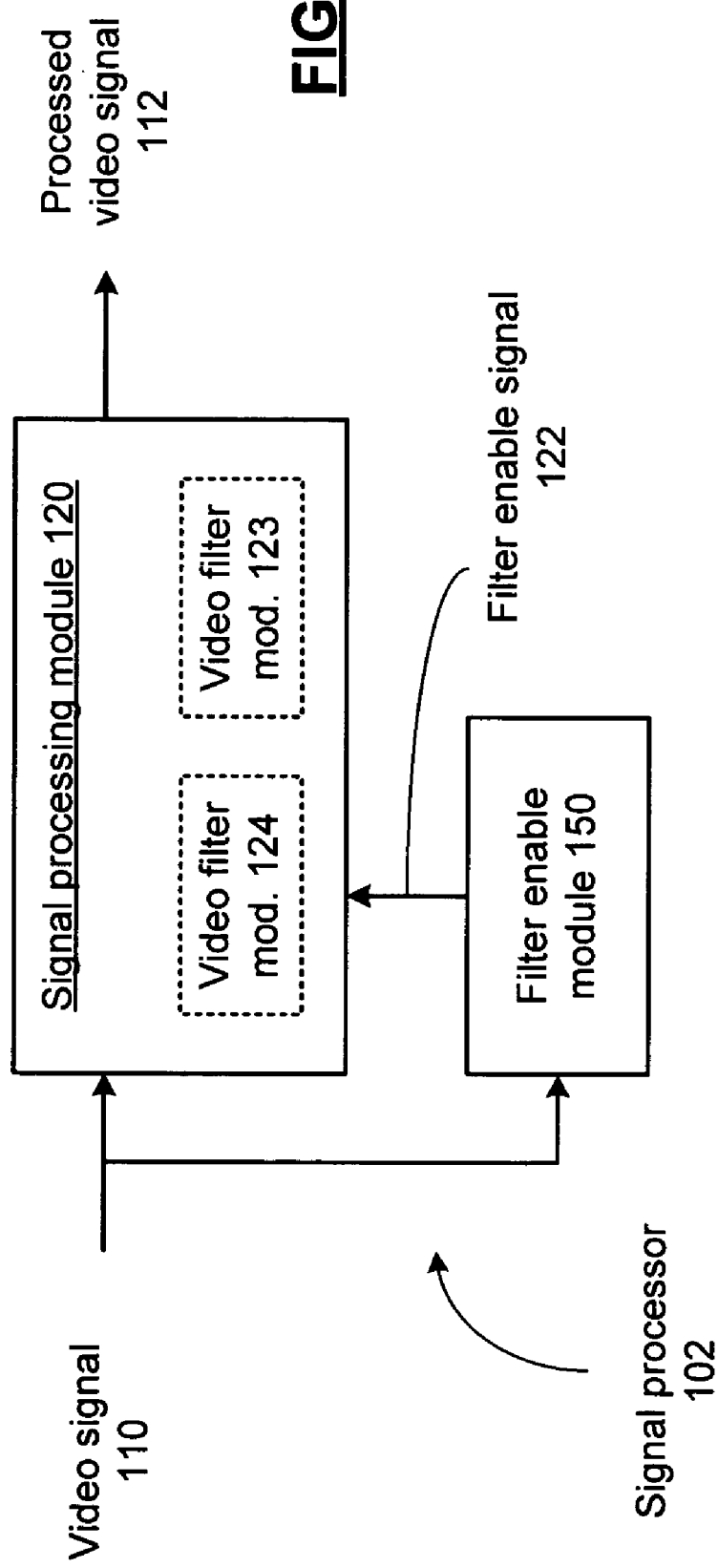
FIG. 6 presents a block diagram representation of a signal processor in accordance with an embodiment of the present invention.

Further details regarding the operation an implementation of signal processor 102 are presented in conjunction with FIG. 6 that follows.

Figure 5:
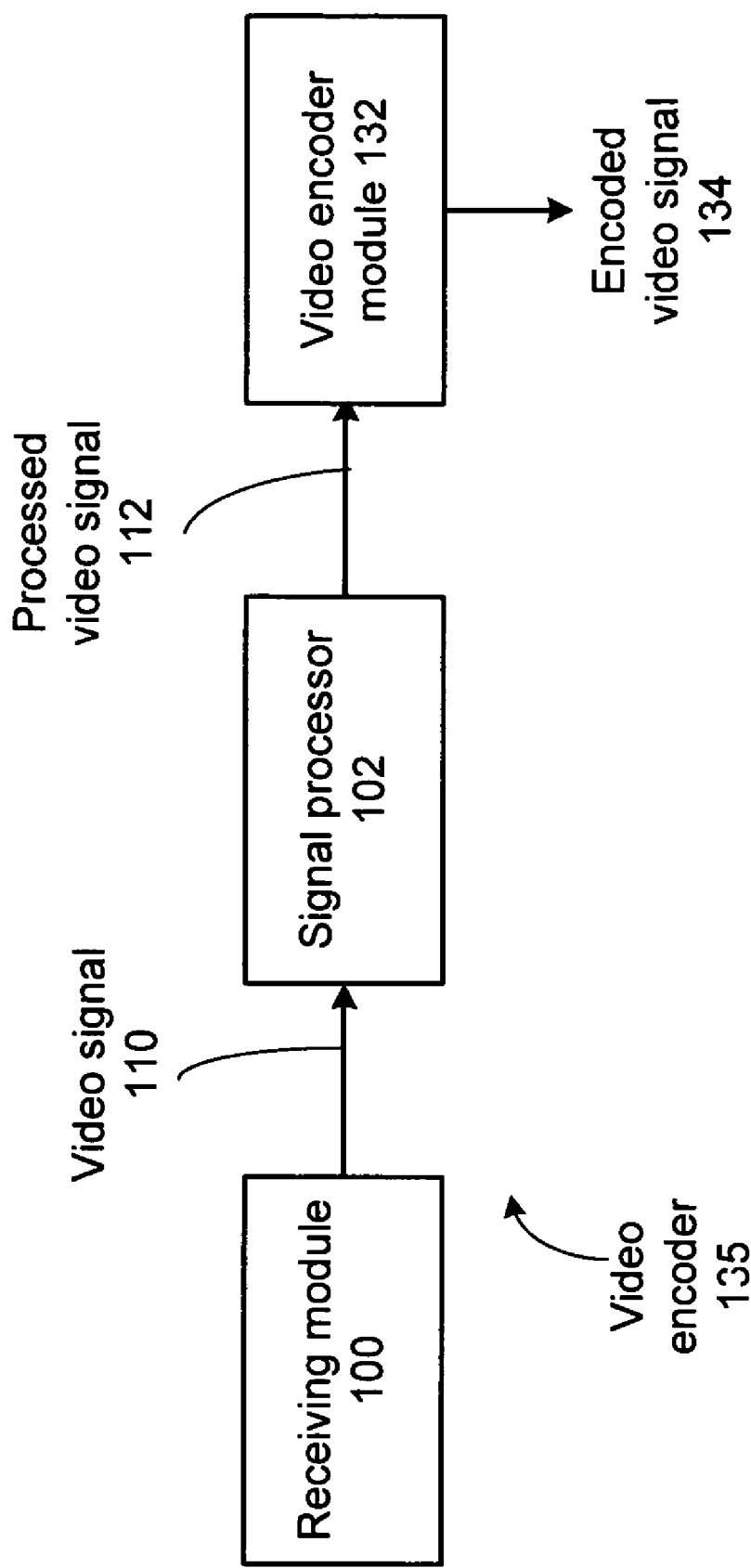
FIG. 5 presents a block diagram representation of a video encoder in accordance with an embodiment of the present invention.

FIG. 5 presents a block diagram representation of a video encoder in accordance with an embodiment of the present invention. In particular, a video encoder 135 is presented that includes receiving module 100 that produces a video signal 110 that can include an analog video signal that is formatted in any of a number of video formats including National Television Systems Committee (NTSC), Phase Alternating Line (PAL) or Sequentiel Couleur Avec Memoire (SECAM). Signal processor 102 produces a processed video signal 112 that is encoded by video encoding module 132 into an encoded video signal 134 in a digital video format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Encoded video signal 134 can be subsequently stored in a memory device, such as an integrated circuit memory either nonremovable or removable, such as a flash memory, memory card etc., a hard disk drive or on other removable media such as an optical disk in a format such as a digital video disk (DVD) format. Encoded video signal 134 can also be transmitted or otherwise distributed as a streaming video signal, broadcast signal or for other purposes.

In an embodiment of the present invention, video encoder module 132 can be implemented in hardware, firmware or software using a processing device that can be a separate processing device or a common processing device used for other purposes, such as the implementation of signal processor 102. Further details regarding the possible implementations of such a processing device are presented in conjunction with the description that follows.

FIG. 6 presents a block diagram representation of a signal processor in accordance with an embodiment of the present invention. In an embodiment of the present invention signal processor 102 includes a signal processing module 120 for generating the processed video signal 112 in response to the video signal 110. Signal processor 102 further includes a filter enable module 150 that is operably coupled to the video signal 110 for generating the filter enable signal 122. The signal processing module 120 includes a video filter module 124 that is enabled when the filter enable signal 122 is asserted and disabled when the filter enable signal 122 is deasserted. Signal processing module 120 optionally includes a video filter module 123 that can be applied when video filter module 124 is disabled. In particular, video filter module 123 is an alternative video filter module that is enabled when the filter enable signal 122 is deasserted and disabled when the filter enable signal 122 is asserted.

In an embodiment of the present invention, the filter enable signal 122 is a multidimensional signal that, for each field of video signal 110 includes an enable flag for each pixel of the field that is either asserted or deasserted. In response to filter enable signal 122, video filter module 124, and optional video filter module 123, can be enabled or disabled on a field by field and pixel by pixel basis.

In an embodiment of the present invention the video filter module 124 includes a first filter such as a 2-line, 3-line, 1D, 2D, 3D, 1H, 2H, and/or temporal comb filter that operates to selectively filter a particular pixel. However, other video filters, and in particular other video filters that benefit from a being selectively enabled and disabled based on the detection of motion, can likewise be implemented within the broad scope of the present invention. When included, video filter module 123 includes a second filter, such as a comb filter, with temporal filtering and motion compensation or other spatial filtering that is either adaptive to motion in a video signal or otherwise operates in the presence of motion to filter the video signal 110 without undue degradation of picture quality.

In an embodiment of the present invention, signal processor 102 is implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The signal processing module 120, filter enable module 150 and the various modules that they contain can be implemented as software, firmware or hardware, depending on the particular implementation of signal processor 102. It should also be noted that the software implementations of the present invention can be stored on a tangible storage medium such as a magnetic or optical disk, read-only memory or random access memory and also be produced as an article of manufacture.

Further details regarding the functions and features of filter enable module 150 are presented in conjunction with FIGS. 7-17 that follow.

Figure 7:
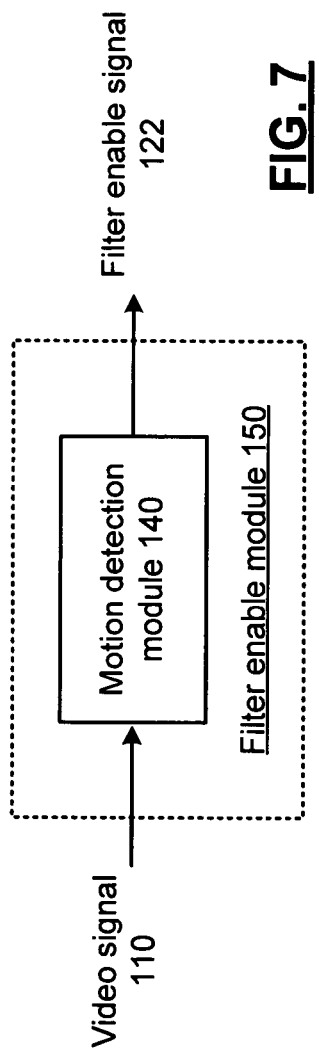
FIG. 7 presents a block diagram representation of a filter enable module in accordance with an embodiment of the present invention.

FIG. 7 presents a block diagram representation of a filter enable module in accordance with an embodiment of the present invention. In particular, filter enable module 150 includes a motion detection module 140 for detecting motion in the at least one of the plurality of pixels and for deasserting the filter enable signal 122 when motion is detected in the at least one of the plurality of pixels. In this fashion, motion can be detected in the video signal 110 on a field by field and pixel by pixel basis. This allows the video filter 124 to be turned-off for any pixels in a field that are experiencing motion so as to avoid degradation that would be caused by the filter due to this motion.

Figure 8:
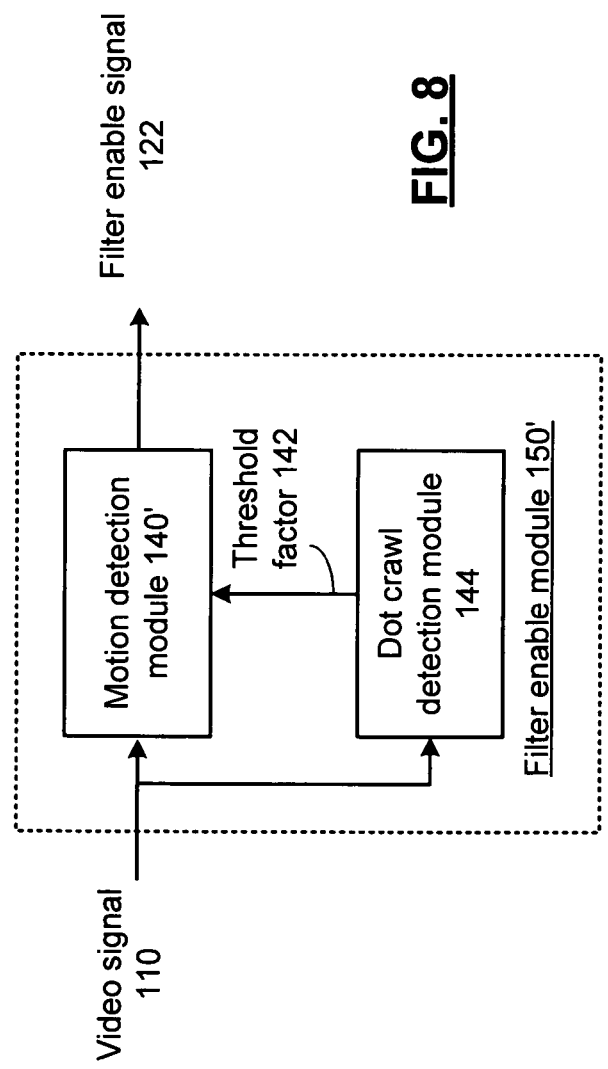
FIG. 8 presents a block diagram representation of a filter enable module in accordance with an embodiment of the present invention.

FIG. 8 presents a block diagram representation of a filter enable module in accordance with an embodiment of the present invention. In particular, a filter enable module 150' is presented that includes a motion detection module 140' that detects motion adaptively based on a threshold factor 142 generated by a dot crawl detection module 144. Further functions and features of motion detection modules 140 and 140' and optional dot crawl detection module 144 are presented in association with FIGS. 9-16 that follow.

Figure 9:
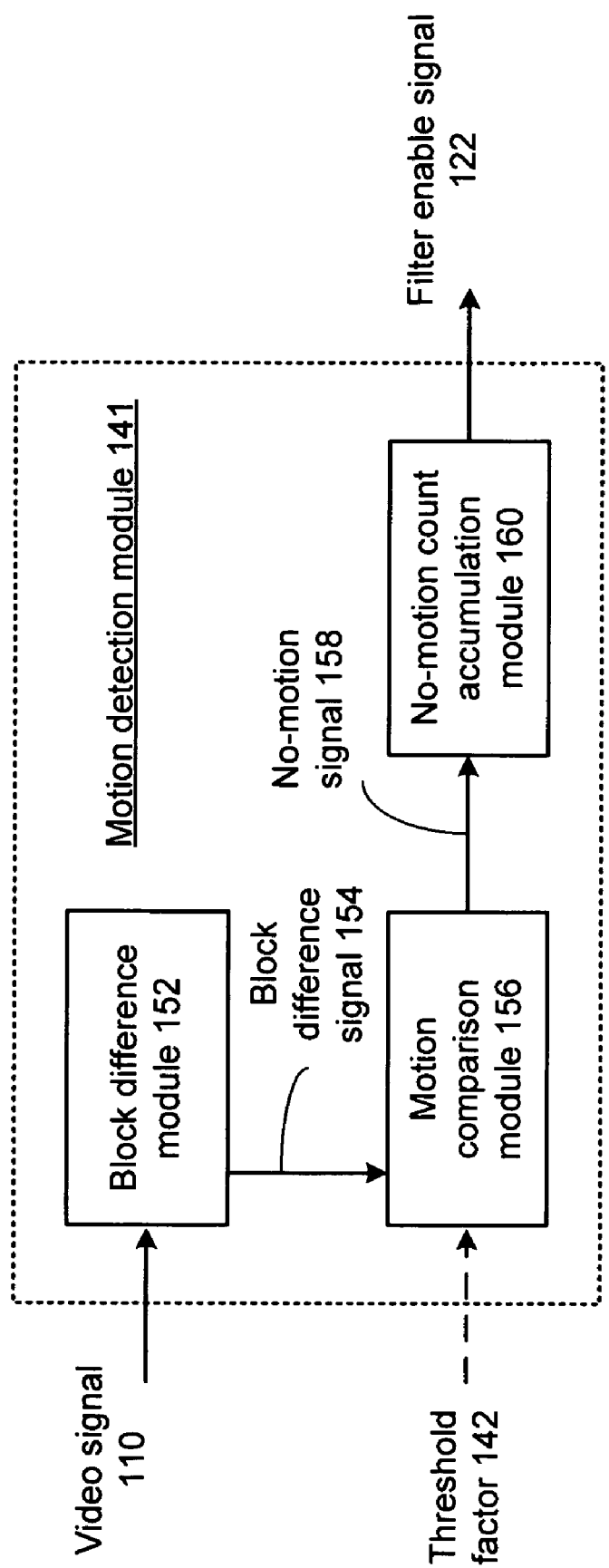
FIG. 9 presents a block diagram representation of a motion detection module in accordance with an embodiment of the present invention.

FIG. 9 presents a block diagram representation of a motion detection module in accordance with an embodiment of the present invention. In particular, a motion detection module 141 is presented that can be used to implement motion detection modules 140 and 140' previously discussed. Motion detection module 141 includes a block difference module 152 for generating a block difference signal 154 for each pixel in a field based on a difference between pixel values of a first block of pixels containing the pixel in a first field of the plurality of fields and pixel values of a second block of pixels containing the pixels in a second field of the plurality of fields.

Motion detection module 141 further includes a motion comparison module 156 for generating a no-motion signal 158 when the motion difference signal 154 compares favorably to a motion threshold. In an embodiment of the present invention, the motion threshold is a predetermined value that differentiates block difference signals 154 indicative of an amount of motion in a pixel that would cause an unacceptable level of degradation, when subjected to filtering by video filter 124.

In an embodiment of the present invention, the motion threshold is adaptive and is generated based on an optional threshold factor 142 from dot crawl detection module 144. In an embodiment, the detection of dot crawl (as reflected in threshold factor 142) can be used to skew the motion detection threshold toward a finding of no-motion that results in the filter enable signal 122 being asserted and the video filter 124 being engaged to correct for the dot crawl. Conversely, in the absence of dot crawl or the presence of a minimal level of dot crawl, the motion detection threshold can be skewed toward the detection of motion that results in the video filter 124 being disabled.

In an embodiment, the threshold factor 142 increases based on the amount of dot crawl or rainbow swirl that is detected and the motion threshold is calculated based on the product of the threshold factor 142 and a predetermined motion threshold value. In an embodiment, the threshold factor 142 is a discrete variable and the threshold factor includes one of a plurality of discrete values. For instance, the threshold factor 142 can take on a value of 2 for high dot crawl, a value of 1 for moderate dot crawl and a value of 0 for low dot crawl. However, other designs using continuous variables, logical variables and other mathematical combinations including the inversion of the mathematical quantities described above can likewise be used within the broad scope of the present invention.

The motion detection module 141 further includes a no-motion count accumulation module 160 for generating the filter enable signal 122 for each pixel based on an accumulation of the no-motion signal 158 over at least two of the plurality of fields. In an embodiment, the at least two of the plurality of fields include consecutive fields of different parity. The no-motion count accumulation module 160 increases the no-motion count by an amount, such as one, for each pixel in a field where the no-motion signal 158 indicates that no motion was detected. For each field, the no-motion count accumulation module 160 compares the accumulation of the no-motion signal 158 for each pixel to a no-motion count threshold and asserts the filter enable signal 122 for those pixels that meet the condition that the accumulation of the no-motion signal compares favorably to the no-motion count threshold. However, the no-motion count accumulation module 160 resets the accumulation of the no-motion signal 158 for those pixels in the field having a no-motion signal that indicates that motion is detected. In this fashion, the filter enable signal 122 is asserted for a particular pixel when no motion is detected over a number of consecutive fields corresponding to the value of the no-motion count threshold (for instance, 4-8 fields). When motion is detected, the accumulation is reset, the filter enable signal 122 is deasserted and the video filter module 124 is turned off for that particular pixel until the number of number of consecutive fields with no motion is achieved for that pixel. In an embodiment of the present invention, the video filter module 123 is turned on when video filter module 124 is turned off and vice versa.

Figure 10:
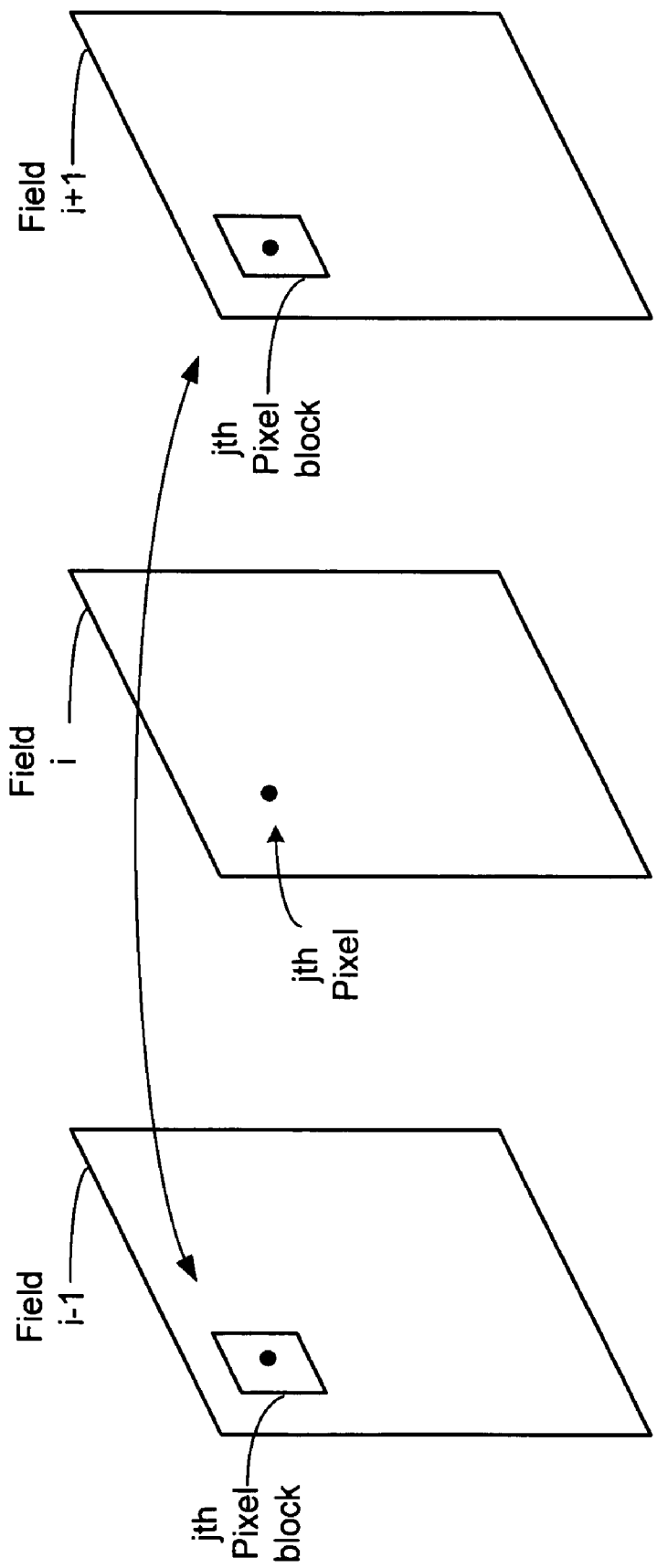
FIG. 10 presents a temporal representation of a set of fields of a video signal in accordance with an embodiment of the present invention.

FIG. 10 presents a temporal representation of a set of fields of a video signal in accordance with an embodiment of the present invention. In particular, FIG. 10 illustrates a particular method for calculating the block difference signal 154 by block difference module 152. Three consecutive fields of video signal 110 of common parity, (field i−1, field i, field i+1) are shown. A block difference for a particular pixel, in this case, the jth pixel of the ith field, is determined based on the difference in pixel values from a pixel block containing the jth pixel (the jth pixel block) from the (i+1)st field and the (i−1)st field.

The jth pixel block in each field is shown as a rectangular block of contiguous pixels however other block configurations are likewise possible. Block difference module 152 calculates a block difference signal 154 for the jth pixel of field i by averaging a pixel difference between each pixel value in jth pixel block of field i+1 with the corresponding pixel value in the jth pixel block of field i−1.

In an embodiment of the present invention the pixel difference is proportional to the magnitude of the difference between the pixel value of a pixel in field i+1 and the pixel value of the same pixel in field i−1. In an alternative embodiment of the present invention the pixel difference is proportional to the square of the difference between the pixel value of a pixel in field i+1 and the pixel value of the same pixel in field i−1. The pixel differences are averaged over the jth pixel block by summing the differences for each pixel in the block and optionally by dividing by the number of pixels in the jth pixel block to calculate the block difference signal 154 for the jth pixel.

While the embodiment above has been described in terms of calculating a block difference signal 154 for the jth pixel of field i based on pixel values in fields i+1 and i−1, similarly, other embodiments can likewise use other differences calculated between fields that are more closely spaced, such as 1 field apart, or distantly spaced, such as by 3, 4 or more fields apart. In an embodiment of the present invention, the field spacing use for calculating block difference signal 154 is programmable and/or adaptive to the format of video signal 110. In accordance with this embodiment, fields i+1 and i−1 are used for calculating block difference signal 154 when video signal 110 includes an NTSC video signal and fields i+2 and i−2 are used for calculating block difference signal 154 when video signal 110 includes a PAL video signal.

In an embodiment of the present invention the pixel blocks are chosen to have the same size, such as a 3×3, 5×5 blocks, 3×5 blocks, 15×1 blocks, 15×7 blocks, etc. so that the jth pixel can be centered in the jth pixel block, however other configuration are possible within the broad scope of the present invention. In this circumstance, the average can be calculated without dividing by the number of pixels, since each block difference would be divided by a constant.

Figure 11:
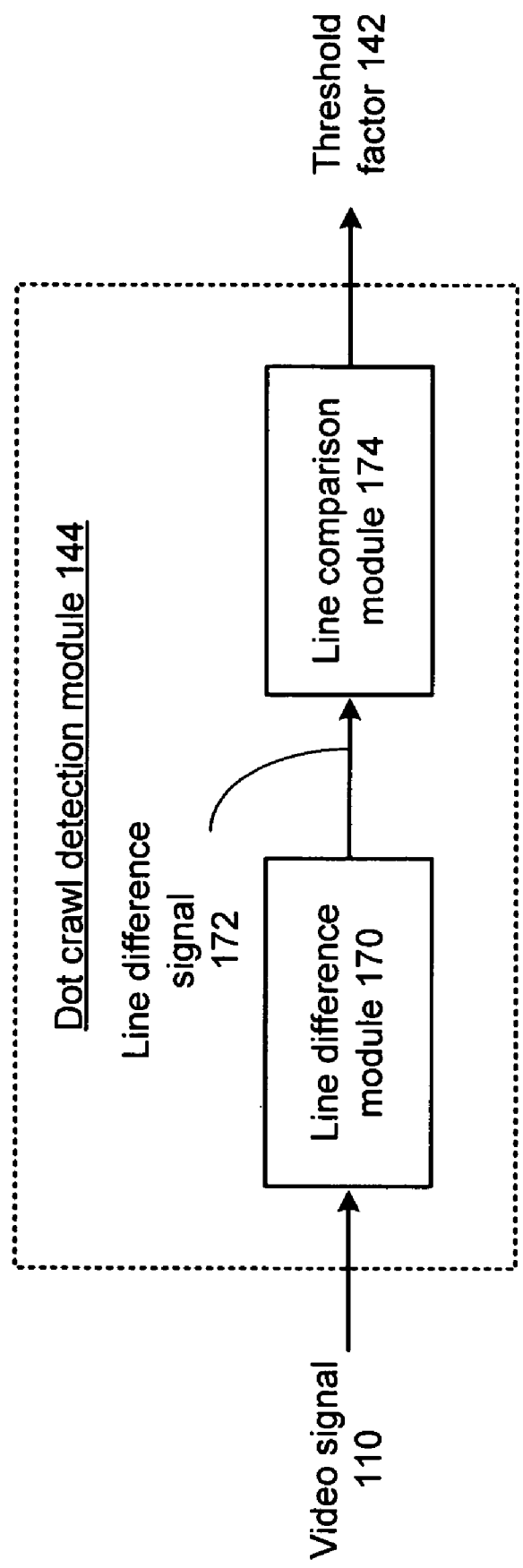
FIG. 11 presents a block diagram representation of a dot crawl detection module in accordance with an embodiment of the present invention.

FIG. 11 presents a block diagram representation of a dot crawl detection module in accordance with an embodiment of the present invention. In particular, dot crawl detection module 144 includes a line difference module 170 for generating a line difference signal 172 for each pixel in a field based on the difference between pixel values of a first line of pixels from a block of pixels in the field containing the particular pixel and a second line of pixels from the block of pixels. Dot crawl detection module 144 further includes a line comparison module 174 for calculating the threshold factor 142 based on a comparison of the line difference signal 142 to a plurality of line difference thresholds. In the example previously discussed, where the threshold factor 142 takes on a value of 2 for high dot crawl, a value of 1 for moderate dot crawl and a value of 0 for low dot crawl, two line difference thresholds are used. However, other configurations using a greater or lesser number of line difference thresholds can likewise be implemented in accordance with this embodiment. In an embodiment of the present invention, line comparison module 174 can be omitted or modified such that the threshold factor 142 is be proportional to or otherwise calculated as a function of the line difference signal 172.

Figure 12:
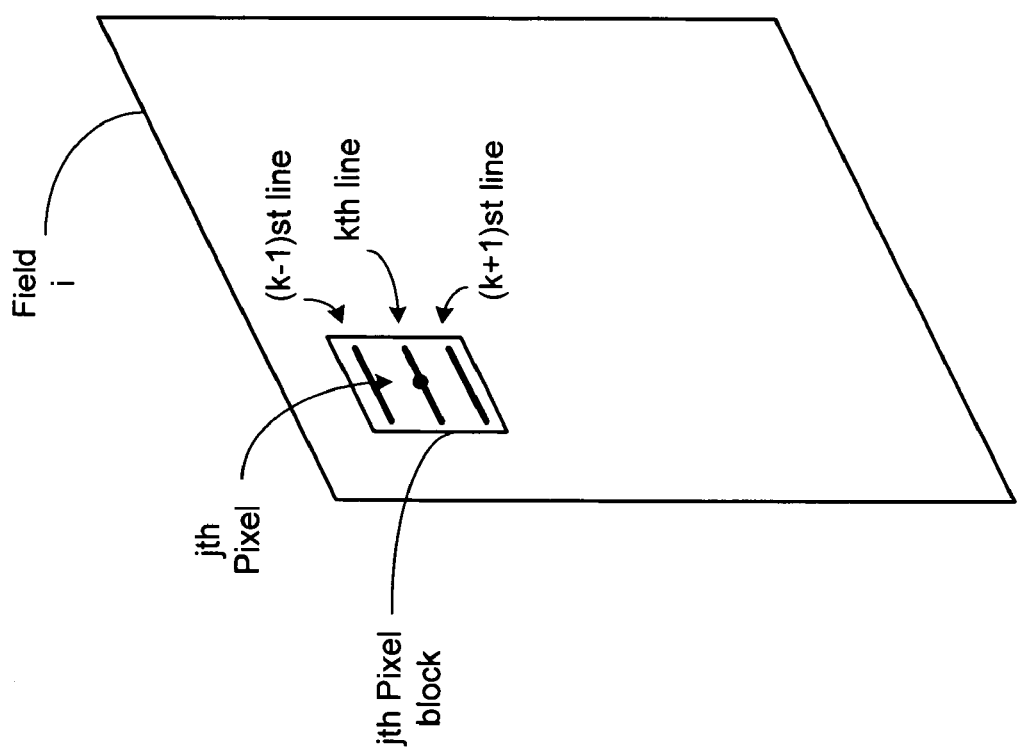
FIG. 12 presents a graphical representation of a field of a video signal in accordance with an embodiment of the present invention.

FIG. 12 presents a graphical representation of a field of a video signal in accordance with an embodiment of the present invention. In particular, FIG. 12 illustrates a particular method for calculating the line difference signal 172 by line difference module 170. The field i of video signal 110 is shown again. A line difference for a particular pixel, in this case, the jth pixel of the ith field, is determined based on the difference in pixel values between adjacent lines of pixels in a pixel block containing the jth pixel.

The jth pixel block is shown as a rectangular block of contiguous pixels. Line difference module 170 calculates a line difference signal 172 for the jth pixel of field i by averaging a pixel difference between each pixel value in kth line of the jth pixel block of field i with the corresponding pixel value in the (k−1)st line of the jth pixel block of field i. In an embodiment of the present invention the line difference signal for the jth pixel further includes an average of other adjacent lines of the jth pixel block, such as the difference between each pixel value in (k+1)st line of the jth pixel block of field i with the corresponding pixel value in the kth line of the jth pixel block of field i.

In an embodiment of the present invention the pixel difference is proportional to the magnitude of the difference between the pixel value of corresponding pixels in adjacent lines. In an alternative embodiment of the present invention the pixel difference is proportional to the square of the difference between the pixel value of corresponding pixels in adjacent lines. The line differences are calculated by summing the pixel differences and optionally by dividing by the number of pixel differences summed to calculate the line difference signal 172 for the jth pixel.

While the embodiment above has been described in terms of calculating a line difference signal 172 for the jth pixel of field i based on pixel values in lines k+1, k and k−1, similarly, other embodiments can likewise use other differences calculated between lines that are more distantly spaced, such as by 2 or more lines apart. In an embodiment of the present invention, the field spacing use for calculating line difference signal 172 is programmable and/or adaptive to the format of video signal 110. In accordance with this embodiment, lines k+1, k and k−1 are used for calculating line difference signal 172 when video signal 110 includes an NTSC video signal and lines k+2, k and k−2 are used for calculating line difference signal 172 when video signal 110 includes a PAL video signal.

In an embodiment of the present invention the pixel blocks are chosen to have the same size and the same number of lines, such as a 3×3, 5×5 blocks, 3×5 blocks, 15×7 blocks etc so that the jth pixel can be centered in the jth pixel block, however other configuration are possible within the broad scope of the present invention. In this circumstance, the average can be calculated without dividing by the number of pixel differences, since each line difference would be divided by a constant. It should be noted that the pixel blocks used for calculating the line difference signal 172 can be either the same size and configuration or a different size and configuration as the pixel blocks used to calculate block difference signal 154.

The operation of the motion detection module 141 and dot crawl detection module 144, in accordance with an embodiment of the present invention, can be described in terms of a further example. In this case, block difference module 152 and line difference module 170 each use 3×3 pixel blocks (containing three lines of pixels) in their respective calculations that are centered on each pixel of interest. Considering a particular pixel of field i, line difference module 170 sums the absolute difference in pixel values between the pixels in the first line and the corresponding pixels in the second line with the sum of the absolute difference in pixel values between the pixels in the second line and the corresponding pixels in the third line. Line comparison module 174 compares the resulting line difference signal 172 with first and second line difference thresholds. If the line difference signal 172 is less than both thresholds, a threshold factor 142 of "0" is assigned. If the line difference signal 172 is less than one threshold but greater than the other threshold, a threshold factor 142 of "1" is assigned. If the line difference signal 172 is greater than both thresholds, a threshold factor 142 of "2" is assigned.

Block difference module 152 calculates block difference signal 154 for this pixel in the ith field based on a sum of pixel value differences between the pixels in corresponding 3×3 blocks in the (i+1)st field and the (i−1)st field. The resulting block difference signal is compared with a motion threshold that is calculated from the product of a predetermined motion threshold and the threshold factor 142. In this example, small values line of difference signal 172, corresponding to minimal dot crawl, result in a threshold factor 142 and motion threshold of "0". In this case, any non-zero value of the block difference signal 154 result in a motion determination that resets the no-motion count accumulation and results in the filter enable signal 122 being deasserted.

Moderate values of line difference signal 172, corresponding to moderate dot crawl, result in a threshold factor 142 and motion threshold of "1". In this case, moderately large values of the block difference signal 154 result in a motion determination that resets the no-motion count accumulation and results in the filter enable signal 122 being deasserted. Otherwise, moderately small values of the block difference signal 154 result in a no-motion determination that adds to the no-motion count accumulation and results in the filter enable signal 122 being asserted, if the no-motion count accumulation is greater than or equal to the no-motion count threshold.

Large values of line difference signal 172, corresponding to high dot crawl, result in a threshold factor 142 and motion threshold of "2". In this case, only large values of the block difference signal 154 result in a motion determination that resets the no-motion count accumulation and results in the filter enable signal 122 being deasserted. Otherwise, other values of the block difference signal 154 result in a no-motion determination that adds to the no-motion count accumulation and results in the filter enable signal 122 being asserted, if the no-motion count accumulation is greater than or equal to the no-motion count threshold.

While the foregoing description of dot crawl detection module 144 has focused on the detection of dot crawl, other image anomalies such as rainbow swirl would likewise be detected using the techniques described herein.

Figure 13:
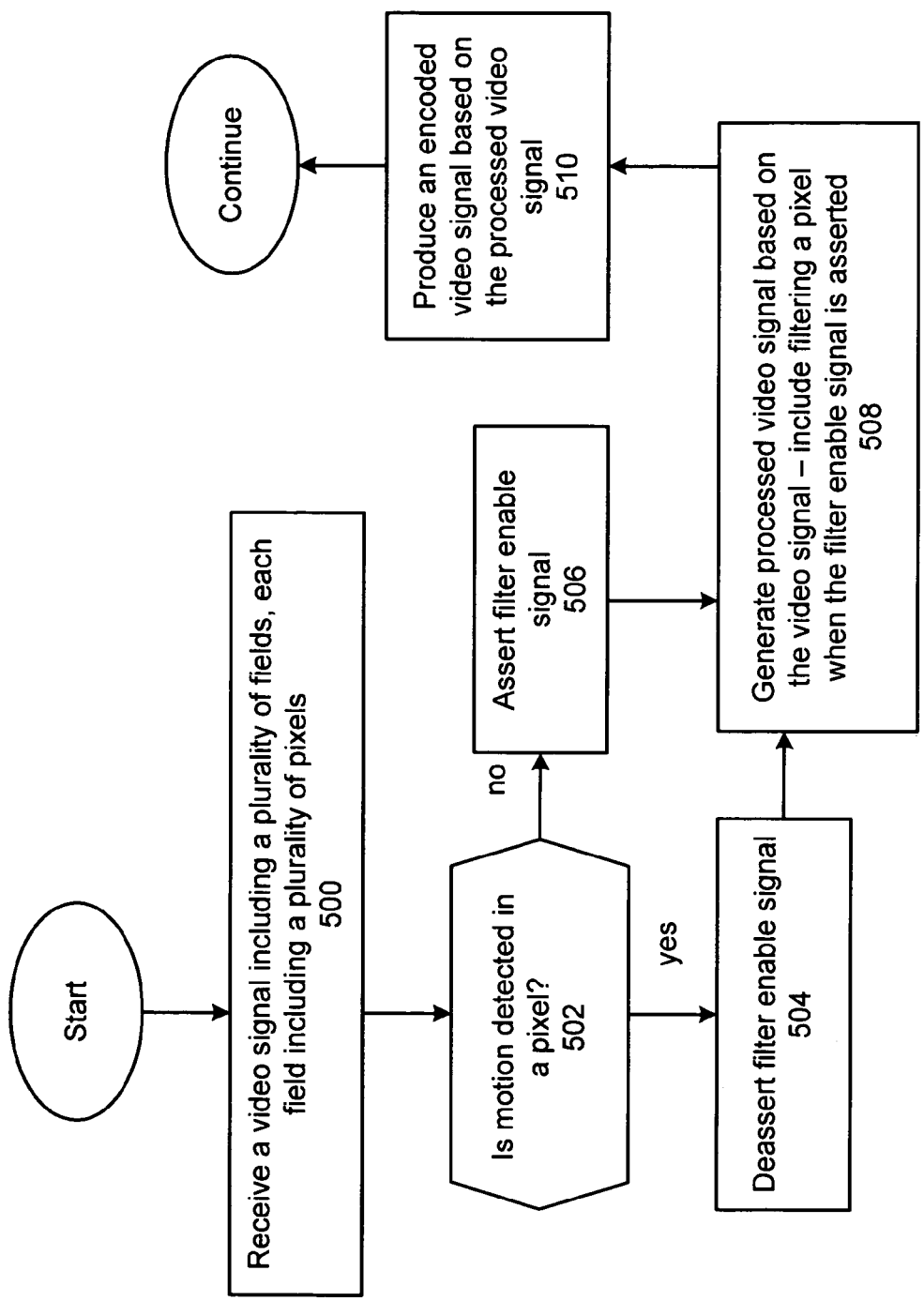
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more of the features and functions described in association with FIGS. 1-12. In step 500 a video signal is received, the video signal including a plurality of fields, wherein each of the plurality of fields includes a plurality of pixels. In step 502 the method determines if motion is detected in a pixel. A filter enable signal is deasserted when motion is detected for the pixel as shown in step 504. The filter enable signal is asserted when no motion is detected for the pixel as shown in step 506. In step 508, a processed video signal is generated based on the video signal, wherein the generation of the processed video signal includes filtering the at least one of the plurality of pixels of a corresponding one of the plurality of fields when the filter enable signal is asserted. An encoded video signal is produced based on the processed video signal as shown in 510.

In an embodiment of the present invention, the method of FIG. 13 is repeated for each pixel and for each field of a video signal. The filtering the at least one of the plurality of pixels in step 508 includes comb filtering. The first block of pixels is centered on the at least one of the plurality of pixels and the second block of pixels is centered on the at least one of the plurality of pixels. The first field of the plurality of fields and the second field of the plurality of fields each have a common parity and are separated by an intermediate field of the plurality of fields having the common parity.

Figure 14:
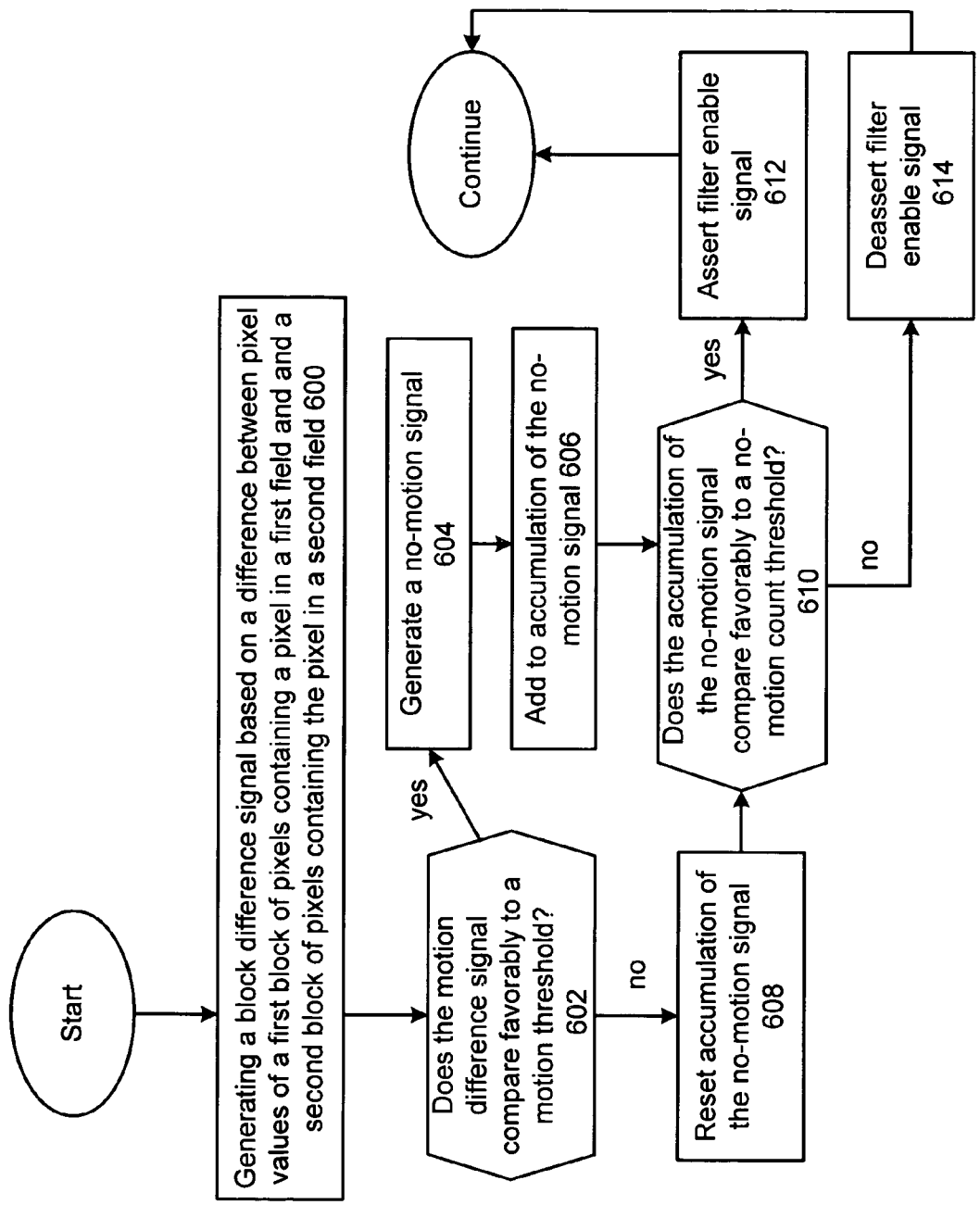
FIG. 14 presents a flowchart representation of a method in accordance with an embodiment of the present invention.

FIG. 14 presents a flowchart representation of a method in accordance with an embodiment of the present invention. In particular, a method is presented for use in conjunction with Step 502 of FIG. 13. In step 600, a block difference signal is generated based on a difference between pixel values of a first block of pixels containing the at least one of the plurality of pixels in a first field of the plurality of fields and pixel values of a second block of pixels containing the at least one of the plurality of pixels in a second field of the plurality of fields. In step 602, the method determines if the motion difference signal compares favorably to a motion threshold. In step 604, a no-motion signal is generated when the motion difference signal compares favorably to a motion threshold. In step 606, an accumulation of the no-motion signal is increased. In step 608, the accumulation of the no-motion signal is reset when the no-motion signal indicates that motion is detected. In step 610, the accumulation of the no-motion signal is compared to the no-motion count threshold. In step 612, the filter enable signal is asserted when the accumulation of the no-motion signal compares favorably to the no-motion count threshold. In step 614, the filter enable signal is deasserted when the accumulation of the no-motion signal does not compare favorably to the no-motion count threshold.

In an embodiment of the present invention, the method includes generating the filter enable signal based on an accumulation of the no-motion signal over at least two of the plurality of fields, wherein the at least two of the plurality of fields include consecutive fields of different parity.

Figure 15:
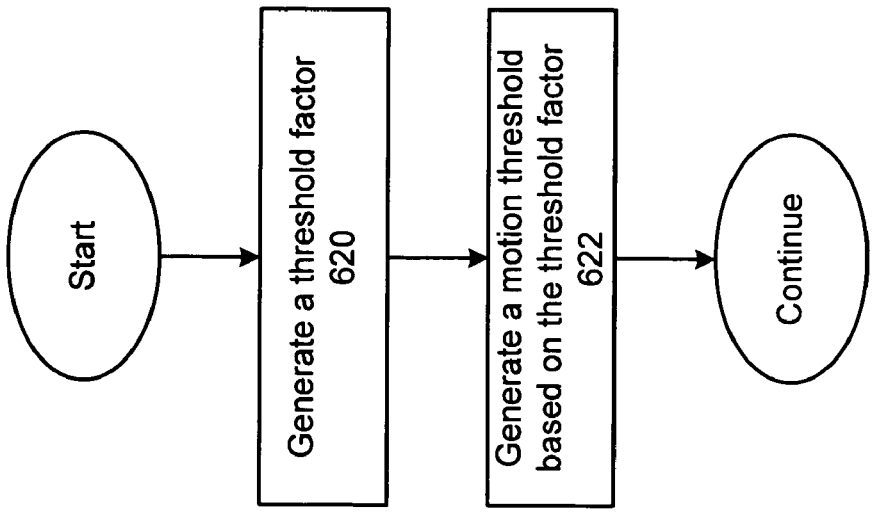
FIG. 15 presents a flowchart representation of a method in accordance with an embodiment of the present invention.

FIG. 15 presents a flowchart representation of a method in accordance with an embodiment of the present invention. In particular, a method is presented for use in conjunction with Step 602 of FIG. 14. In step 620, a threshold factor is generated. In step 622, the motion threshold is generated based on the threshold factor.

In an embodiment of the present invention, step 622 includes generating the motion threshold based on the product of the threshold factor and a predetermined motion threshold value.

Figure 16:
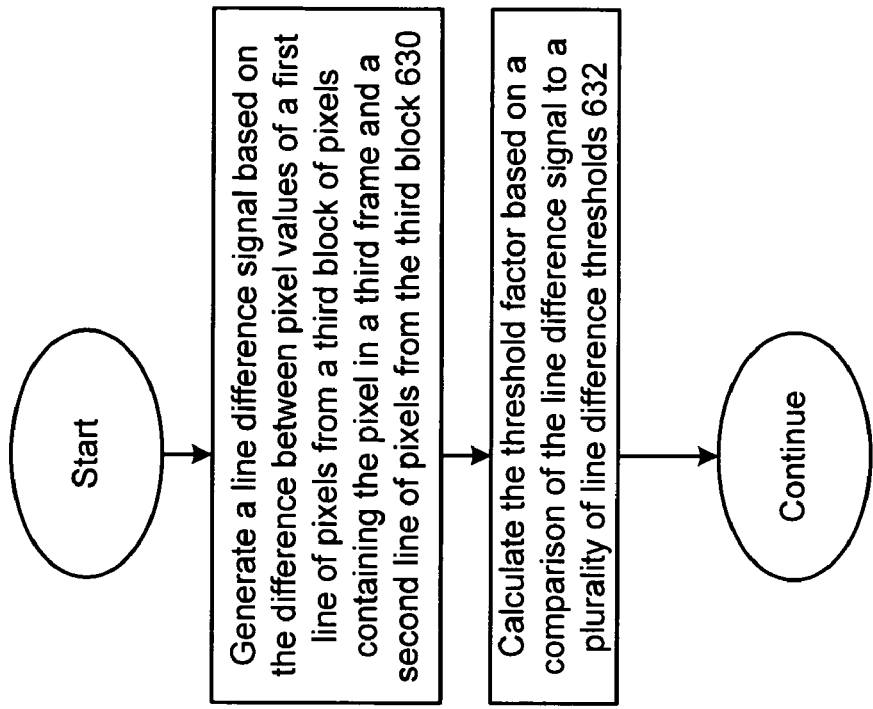
FIG. 16 presents a flowchart representation of a method in accordance with an embodiment of the present invention.

FIG. 16 presents a flowchart representation of a method in accordance with an embodiment of the present invention. In particular, a method is presented for use in conjunction with Step 620 of FIG. 15. In step 630 a line difference signal is generated based on the difference between pixel values of a first line of pixels from a third block of pixels containing the at least one of the plurality of pixels in a third field of the plurality of fields and a second line of pixels from the third block of pixels. In step 632, the threshold factor based on a comparison of the line difference signal to a plurality of line difference thresholds.

In an embodiment of the present invention, the first field and the second field of the plurality of fields are separated by the third field of the plurality of fields and wherein the first field, the second field and the third field of the plurality of fields have a common parity. Further, the threshold factor includes one of a plurality of discrete values.

Figure 17:
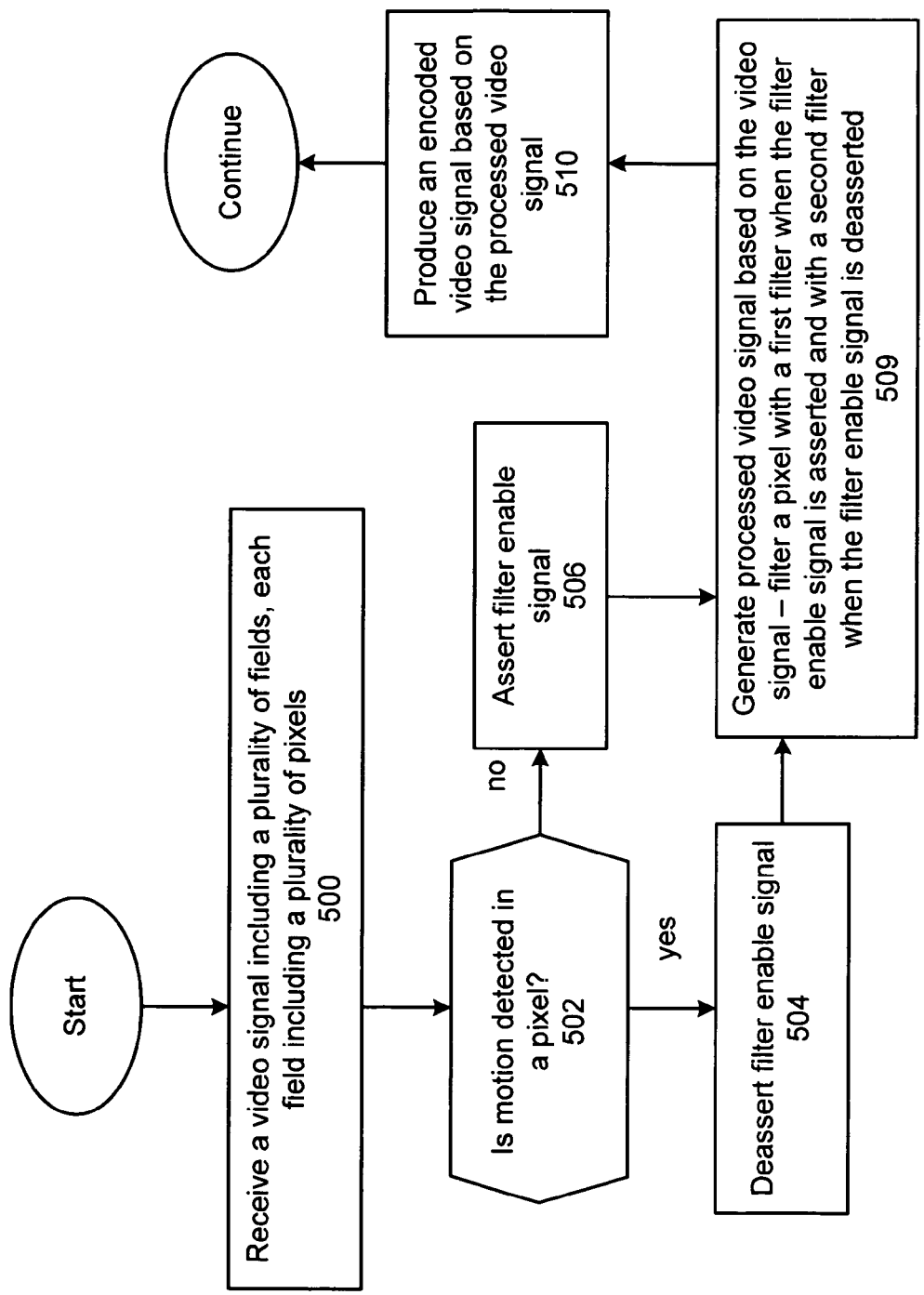
FIG. 17 presents a flowchart representation of a method in accordance with an embodiment of the present invention.

FIG. 17 presents a flowchart representation of a method in accordance with an embodiment of the present invention. In particular, a method is presented that includes many of the steps from FIG. 13 that are commonly numbered. However, in place of step 508, step 509 is included. In step 509, the processed video signal is generated based on the video signal by filtering a pixel with a first filter when the filter enable signal is asserted and with a second filter when the filter enable signal is deasserted.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and a video display device. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video encoder comprising:
    a receiving module for receiving a video signal, the video signal including a plurality of fields, wherein each of the plurality of fields includes a plurality of pixels;
    a signal processor, operably coupled to the receiving module, the signal processor including:
        a signal processing module for generating a processed video signal in response to the video signal, the signal processing module including a video filter module that is enabled when a filter enable signal is asserted and disabled when the filter enable signal is deasserted, for filtering at least one of the plurality of pixels of a corresponding one of the plurality of fields when the video filter module is enabled;
        a filter enable module, operably coupled to the video signal, for generating the filter enable signal, the filter enable module including a motion detection module for detecting motion in the at least one of the plurality of pixels and for deasserting the filter enable signal when motion is detected in the at least one of the plurality of pixels; and
    a video encoding module, operably coupled to the signal processor, for producing an encoded video signal based on the processed video signal.

2. The video encoder of claim 1 wherein the video filter module includes a comb filter.

3. The video encoder of claim 1 wherein the motion detection module includes a block difference module for generating a block difference signal based on a difference between pixel values of a first block of pixels containing the at least one of the plurality of pixels in a first field of the plurality of fields and pixel values of a second block of pixels containing the at least one of the plurality of pixels in a second field of the plurality of fields.

4. The video encoder of claim 3 wherein the first block of pixels is centered on the at least one of the plurality of pixels and the second block of pixels is centered on the at least one of the plurality of pixels.

5. The video encoder of claim 3 wherein the first field of the plurality of fields and the second field of the plurality of fields each have a common parity and are separated by an intermediate field of the plurality of fields having the common parity.

6. The video encoder of claim 3 wherein the motion detection module further includes a motion comparison module for generating a no-motion signal when the motion difference signal compares favorably to a motion threshold.

7. The video encoder of claim 6 wherein the filter enable module further includes a dot crawl detection module for generating a threshold factor and wherein the motion threshold is generated based on the threshold factor.

8. The video encoder of claim 7 wherein the motion detection module generates the motion threshold based on the product of the threshold factor and a predetermined motion threshold value.

9. The video encoder of claim 7 wherein the dot crawl detection module includes a line difference module for generating a line difference signal based on the difference between pixel values of a first line of pixels from a third block of pixels containing the at least one of the plurality of pixels in a third field of the plurality of fields and a second line of pixels from the third block of pixels.

10. The video encoder of claim 9 wherein the first field and the second field of the plurality of fields are separated by the third field of the plurality of fields and wherein the first field, the second field and the third field of the plurality of fields have a common parity.

11. The video encoder of claim 9 wherein the threshold factor includes one of a plurality of discrete values.

12. The video encoder of claim 11 wherein the dot crawl detection module further includes a comparison module for calculating the threshold factor based on a comparison of the line difference signal to a plurality of line difference thresholds.

13. The video encoder of claim 6 wherein the motion detection module further includes a no-motion count accumulation module for generating the filter enable signal based on an accumulation of the no-motion signal over at least two of the plurality of fields.

14. The video encoder of claim 13 wherein the at least two of the plurality of fields include consecutive fields of different parity.

15. The video encoder of claim 13 wherein the no-motion count accumulation module compares the accumulation of the no-motion signal to a no-motion count threshold and asserts the filter enable signal when the accumulation of the no-motion signal compares favorably to the no-motion count threshold.

16. The video encoder of claim 13 wherein the no-motion count accumulation module resets the accumulation of the no-motion signal when the no-motion signal indicates that motion is detected.

17. The video encoder of claim 1 wherein the signal processing module further includes an alternative video filter module that is enabled when the filter enable signal is deasserted and disabled when the filter enable signal is asserted, for filtering at least one of the plurality of pixels of a corresponding one of the plurality of fields when the alternative video filter module is enabled.

18. A method comprising:
    receiving a video signal, the video signal including a plurality of fields, wherein each of the plurality of fields includes a plurality of pixels;
    detecting motion in at least one of the plurality of pixels and deasserting a filter enable signal when motion is detected in at least one of the plurality of pixels and asserting the filter enable signal when no motion is detected in the at least one of the plurality of pixels;
    generating a processed video signal based on the video signal, wherein the generation of the processed video signal includes:
        filtering the at least one of the plurality of pixels of a corresponding one of the plurality of fields with a first filter when the filter enable signal is asserted; and
        filtering the at least one of the plurality of pixels of a corresponding one of the plurality of fields with a second filter when the filter enable signal is deasserted; and
    producing a encoded video signal based on the processed video signal.

19. The method of claim 18 wherein filtering the at least one of the plurality of pixels with a first filter includes comb filtering.

20. The method of claim 18 wherein the step of detecting motion includes generating a block difference signal based on a difference between pixel values of a first block of pixels containing the at least one of the plurality of pixels in a first field of the plurality of fields and pixel values of a second block of pixels containing the at least one of the plurality of pixels in a second field of the plurality of fields.

21. The method of claim 20 wherein the first block of pixels is centered on the at least one of the plurality of pixels and the second block of pixels is centered on the at least one of the plurality of pixels.

22. The method of claim 20 wherein the first field of the plurality of fields and the second field of the plurality of fields each have a common parity and are separated by an intermediate field of the plurality of fields having the common parity.

23. The method of claim 20 wherein the step of detecting motion further includes generating a no-motion signal when the motion difference signal compares favorably to a motion threshold.

24. The method of claim 23 further comprising:
generating a threshold factor; and
generating the motion threshold based on the threshold factor.

25. The method of claim 24 wherein the step of generating the motion threshold includes generating the motion threshold based on the product of the threshold factor and a predetermined motion threshold value.

26. The method of claim 24 wherein the step of generating a threshold factor includes generating a line difference signal based on the difference between pixel values of a first line of pixels from a third block of pixels containing the at least one of the plurality of pixels in a third field of the plurality of fields and a second line of pixels from the third block of pixels.

27. The method of claim 26 wherein the first field and the second field of the plurality of fields are separated by the third field of the plurality of fields and wherein the first field, the second field and the third field of the plurality of fields have a common panty.

28. The method of claim 24 wherein the threshold factor includes one of a plurality of discrete values.

29. The method of claim 24 wherein the step of generating the threshold factor includes calculating the threshold factor based on a comparison of the line difference signal to a plurality of line difference thresholds.

30. The method of claim 23 wherein the step of detecting motion includes generating the filter enable signal based on an accumulation of the no-motion signal over at least two of the plurality of fields.

31. The method of claim 30 wherein the at least two of the plurality of fields include consecutive fields of different parity.

32. The method of claim 30 wherein the step of detecting motion includes comparing the accumulation of the no-motion signal to a no-motion count threshold and asserting the filter enable signal when the accumulation of the no-motion signal compares favorably to the no-motion count threshold.

33. The method of claim 30 wherein the step of detecting motion includes resetting the accumulation of the no-motion signal when the no-motion signal indicates that motion is detected.

34. A video display device comprising:
a receiving module for receiving a video signal, the video signal including a plurality of fields, wherein each of the plurality of fields includes a plurality of pixels;
a signal processor, operably coupled to the receiving module, the signal processor including:
a signal processing module for generating a processed video signal in response to the video signal, the signal processing module including a video filter module that is enabled when a filter enable signal is asserted and disabled when the filter enable signal is deasserted, for filtering at least one of the plurality of pixels of a corresponding one of the plurality of fields when the video filter module is enabled;
a filter enable module, operably coupled to the video signal, for generating the filter enable signal, the filter enable module including a motion detection module for detecting motion in the at least one of the plurality of pixels and for deasserting the filter enable signal when motion is detected in the at least one of the plurality of pixels; and
a video display module, operably coupled to the signal processor, for producing a video display based on the processed video signal.

35. The video display device of claim 34 wherein the video filter module includes a comb filter.

36. The video display device of claim 34 wherein the motion detection module includes a block difference module for generating a block difference signal based on a difference between pixel values of a first block of pixels containing the at least one of the plurality of pixels in a first field of the plurality of fields and pixel values of a second block of pixels containing the at least one of the plurality of pixels in a second field of the plurality of fields.

37. The video display device of claim 36 wherein the first block of pixels is centered on the at least one of the plurality of pixels and the second block of pixels is centered on the at least one of the plurality of pixels.

38. The video display device of claim 36 wherein the first field of the plurality of fields and the second field of the plurality of fields each have a common parity and are separated by an intermediate field of the plurality of fields having the common parity.

39. The video display device of claim 36 wherein the motion detection module further includes a motion comparison module for generating a no-motion signal when the motion difference signal compares favorably to a motion threshold.

40. The video display device of claim 39 wherein the filter enable module further includes a dot crawl detection module for generating a threshold factor and wherein the motion threshold is generated based on the threshold factor.

41. The video display device of claim 40 wherein the motion detection module generates the motion threshold based on the product of the threshold factor and a predetermined motion threshold value.

42. The video display device of claim 40 wherein the dot crawl detection module includes a line difference module for generating a line difference signal based on the difference between pixel values of a first line of pixels from a third block of pixels containing the at least one of the plurality of pixels in a third field of the plurality of fields and a second line of pixels from the third block of pixels.

43. The video display device of claim 42 wherein the first field and the second field of the plurality of fields are separated by the third field of the plurality of fields and wherein the first field, the second field and the third field of the plurality of fields have a common parity.

44. The video display device of claim 42 wherein the threshold factor includes one of a plurality of discrete values.

45. The video display device of claim 44 wherein the dot crawl detection module further includes a comparison module for calculating the threshold factor based on a comparison of the line difference signal to a plurality of line difference thresholds.

46. The video display device of claim 39 wherein the motion detection module further includes a no-motion count accumulation module for generating the filter enable signal based on an accumulation of the no-motion signal over at least two of the plurality of fields.

47. The video display device of claim 46 wherein the at least two of the plurality of fields include consecutive fields of different parity.

48. The video display device of claim 46 wherein the no-motion count accumulation module compares the accumulation of the no-motion signal to a no-motion count threshold and asserts the filter enable signal when the accumulation of the no-motion signal compares favorably to the no-motion count threshold.

49. The video display device of claim 46 wherein the no-motion count accumulation module resets the accumulation of the no-motion signal when the no-motion signal indicates that motion is detected.

50. The video display device of claim 34 wherein the signal processing module further includes an alternative video filter module that is enabled when the filter enable signal is deasserted and disabled when the filter enable signal is asserted, for filtering at least one of the plurality of pixels of a corresponding one of the plurality of fields when the alternative video filter module is enabled.

* * * * *

UNITED STATES PATENT AND TRADEMARK OFFICE
CERTIFICATE OF CORRECTION

PATENT NO. : 7,589,796 B2  Page 1 of 1
APPLICATION NO. : 11/348120
DATED : September 15, 2009
INVENTOR(S) : Xinghai Billy Li, Chun-Chin David Yeh and Xu Gang Wilf Zhao It is certified that error appears in the above-identified patent and that said Letters Patent is hereby corrected as shown below:

Column 13, line 33, in Claim 27: replace "panty." with --parity.--

Signed and Sealed this

Seventeenth Day of November, 2009

David J. Kappos
*Director of the United States Patent and Trademark Office*